United States Patent Office 3,579,544
Patented May 18, 1971

3,579,544
TOTAL PROCESS FOR MAKING 13-HYDROCARBON SUBSTITUTED GONAPOLYENE - 17 - ONE COMPOUNDS AND INTERMEDIATES PRODUCED IN THE COURSE OF THE PROCESS
Kentaro Hiraga, Ikeda, Tsunehiko Asako, Suita, and Takuichi Miki, Amagasaki, Japan, assignors to Takeda Chemical Industries, Ltd., Osaka, Japan
No Drawing. Filed May 24, 1968, Ser. No. 731,968
Claims priority, application Japan, May 24, 1967, 42/32,973; May 25, 1967, 42/33,238
Int. Cl. C07c 169/08
U.S. Cl. 260—397.5                 9 Claims

ABSTRACT OF THE DISCLOSURE

A compound having a 16-(etherified or esterified hydroxy)-17-acyloxy-13 - substituted gona-1,3,5(10),8,14-pentaene nucleus is obtained by allowing a compound having a 17-acyloxy-13-substituted 8,14-secogona-1,3,5 (10),9(11),15-pentaene-14-one nucleus to contact with an acid catalyst in presence of alcohol, phenol or fatty acid, and converting the resultant compound having a 16-(etherified or esterified hydroxy)-17-acyloxy-13-substituted gona-1,3,5(10),8,14-pentaene nucleus, directly or after reduction of its double bond at the 8-position or bands at the 8- and 14-positions, to a compound having a 13-(hydrocarbon substituted)gonapolyen-17-one nucleus. It is thus made possible to effect the total synthesis of the gona polyenes (e.g. estrone) via a lesser number of steps than has heretofore been possible.

The present invention relates to a novel process for producing a compound having a gonapolyen-17-one nucleus substituted in the 13-position by a hydrocarbonyl residue, e.g. a lower alkyl, benzyl or phenyl radical, and to novel intermediates therefor. More concretely, this invention relates to an improved total synthesis of a compound having a 13-(hydrocarbon substituted)gona-2,5 (10)-dien-17-one nucleus, a compound having a 13-(hydrocarbon substituted)gona -1 ,3,5(10)-trien-17-one nucleus or a compound having a 13 - (hydrocarbon substituted)gona-1,3,5(10),8-tetraen-17-one nucleus and of novel intermediates therefor, e.g. a compound having a 16-(etherified or esterified hydroxy - 17-acyloxy-13-substituted gona-1,3,5(10),8,14 - pentaene nucleus, a compound having a 16-(etherified or esterified hydroxy-17-acyloxy)-13-substituted gona-1,3,5(10),8-tetraene nucleus, a compound having a 16-(etherified or esterified hydroxy)-17-(hydroxy or acyloxy)-13-substituted gona-1,3, 5(10)-triene nucleus, a compound having a 16-(etherified or esterified hydroxy)-17-(hydroxy or acyloxy)-13-substituted gona-2,5,(10)-diene nucleus, all of which have a hydrocarbon residue at the position 13 as a substituent.

The reason why partial synthesis has overwhelmed total synthesis in industrial production of steroids is attributable mainly to difficulty in treating a number of diastereoisomers which are concomitantly formed either at the cyclization to form the steroid skeleton or at the saturation of the unsaturated bonds.

Recently, more improved total synthesis of 19-nor-steroids have been reported independently by Smith et al. (Experientia, 19, 394–396 (1963, No. 8), Windholz et al. (Journal of Organic Chemistry, 28, 1092–1094 (1963)), Miki et al. (Proceedings of the Chemical Society, May 1963, 139) and Crispin et al. (ibid., January 1963, 22). Although these processes brought hope of realizing an industrial total synthesis of steroids, the processes are still accompanied by some difficulties, one of which is that the processes involve very long series of steps, and another is that 2-substituted cyclopentane-1,3-dione, one of the starting compounds of these processes, is rather expensive.

The present invention is based upon unexpected discoveries that a compound having a 16-(etherified or esterified hydroxy)-17-acyloxy-13-substituted gona-1,3,5 (10),8,14-pentaene nucleus can readily be produced by allowing a compound having a 17-acyloxy-13-substituted 8,14-secogona-1,3,5(10),9(11),15-pentaen-14-one nucleus to contact with an acid catalyst in the presence of alcohol, phenol or fatty acid, and by converting the so-obtained compound having a 16-(etherified or esterified hydroxy)-17-acyloxy-13-substituted gona-1,3,5(10),8,14-pentaene nucleus, directly or after reduction of its double bond at the 8-position or bonds at the 8- and 14-positions, to a compound having a 13-(hydrocarbon substituted)gonapolyen-17 - one nucleus: i.e. a compound having a 13 - (hydrocarbon substituted)gona - 2,5(10)-dien-17-one nucleus, a compound having a 13-(hydrocarbon substituted)gona-1,3,5(10)-trien-17-one nucleus and a compound having a 13-(hydrocarbon substituted)gona-1,3,5(10),8-tetraen-17 - one nucleus; see accompanying chart.

Owing to these discoveries, it is made possible to save one step in the total synthesis of the gona polyenes (e.g. estrone). For example, estrone can be prepared through 7 steps starting from the compounds (I) and (II) in the present process, while the known process requires 8 steps starting from the same compounds. Besides, the optical resolution process which is inevitable in the known process can be saved, when optically active 17-hydroxy-13-(hydrocarbon substituted)-8,14-secogona-1,3,(10),9(11), 15-pentaen-14-one compound is employed, said compound being prepared by the microbiological reduction of the carbonyl at position 17 of the corresponding 14,17-dione compound. Furthermore, the present invention makes it possible to employ 4-hydroxy-2-(hydrocarbon substituted)cyclopentane-1,3-dione, which is readily obtained from the corresponding 1,3,4-trione in a high yield (Journal of American Chemical Society, 65, 2296 (1943)), instead of the 2-substituted-cyclopentane-1,3-dione which has been used in the known total synthesis of steroids, and which is prepared only in a very low yield.

One of the objects of the present invention is therefore to provide a process for producing a compound having a 16-(etherified or esterified hydroxy)-17-acyloxy-13-(hydrocarbon substituted)gona - 1,3,5(10),8,14-pentaene nucleus directly from a compound having a 17-acyloxy-13-(hydrocarbon substituted) - 8,14-secogona-1,3,5(10), 9(11),15-pentaen-14-one nucleus.

Another object of this invention is to provide a process for producing a compound having a 13-(hydrocarbon substituted)gonapoly(di, tri or tetra)en-17-one nucleus starting from a compound having a 13-(hydrocarbon substituted)-8,14-secogona - 1,3,5(10),9(11),15 - pentaene-14,17-dione nucleus.

Further object of this invention is to provide novel compounds having a 16-(etherified or esterified hydroxy)-17-acyloxy-13-(hydrocarbon substituted)gona - 1,3,5(10), 8,14-pentaene nucleus, compounds having a 16-(etherified or esterified hydroxy)-17-acyloxy - 13 - hydrocarbon substituted)gona - 1,3,5(10),8 - tetraene nucleus, compounds having a 16-(etherified or esterified hydroxy)-17-(hydroxy or acyloxy)-13-(hydrocarbon substituted)gona- 1,3,5(10)-triene nucleus and compounds having a 16-(etherified or esterified hydroxy)-17-(hydroxy or acyloxy)13-(hydrocarbon substituted)gona - 2,5(10) - diene nucleus.

Other objects will become apparent from the detailed description hereinafter provided.

The first step of the present invention is the preparation of a compound having a 17-hydroxy-13β-(hydrocarbon substituted) - 8,14 - secogona - 1,3,5(10),9(11),15-pentaen-14-one nucleus(IV), for example, by subjecting a compound having a 13-(hydrocarbon substituted)-8,14-secogona-1,3,5(10),9(11),15 - pentaene - 14,17 - dione nucleus (III) to so-called Merrwein-Pondorf-Verley reduction employing aluminum alkoxide (e.g. aluminum isopropoxide, phenoxide, etc.) in a solvent such as methanol, ethanol, isopropanol, butanol, tetrahydrofuran, dioxane, ether, petroleum ether, chloroform, benzene, toluene, dimethyl formamide or pyridine at a temperature of about −60° C. to about 85° C., or by subjecting the same compound to a biological selective reduction employing a microorganism belonging to the genus Saccharomyces (e.g. *S. carlsbergensis, S. pastorianus*), the genus Candida (e.g. *C. solani*), the genus Debaryomyces (e.g. *D. vini, D. vanriji*), the genus Kloeckera (e.g. *K. magna*, etc.), the genus Pichia (e.g. *P. wickerhamii, P. pijperi*), the genus Petasospora (e.g. *P. chambardi*), the genus Torulopsis (e.g. *T. gropengiesseri, T. famata*) or the genus Hansenula (e.g. *H. wingei, H. holstii, H. capsulata*).

The above-mentioned compound having a 13-(hydrocarbon substituted) - 8,14 - secogona-1,3,5(10),9(11),15-pentaene-14,17-dione nucleus represented by the formula:

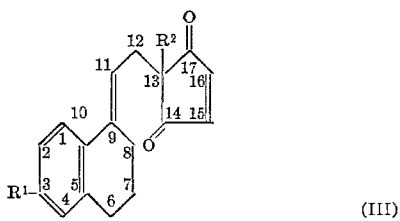

(III)

wherein $R^1$ is hydrogen, hydroxyl, etherified hydroxyl radical (e.g. methoxy, ethoxy, benzyloxy), or esterified hydroxyl radical (e.g. acetoxy, benzoyloxy, nicotinoyloxy), and $R^2$ is a hydrocarbon residue, which is exemplified by a lower alkyl (e.g. methyl, ethyl, n-propyl, isopropyl, n-butyl and isobutyl), phenyl or benzyl, and/or, at one or more of the positions 1,2 and 4 in the skeleton, by a hydroxyl group, an etherified hydroxy group (e.g. methoxy, ethoxy, n-propoxy and n-butoxy), an esterified hydroxyl group (e.g. acetoxy, propionyloxy and benzoyloxy), a halogen (e.g. fluorine and chlorine), a thio group (e.g. mercapto, methylthio, ethylthio and acetylthio) and an acyl group (e.g. acetyl, propionyl and benzoyl), and/or at the position 15 in the skeleton, the hydrogen atom may further be replaced by a hydrocarbon residue as exemplified above.

The compound (III) is prepared by, for example, a condensation reaction between a compound having a 4-hydroxy-2-(hydrocarbon substituted)cyclopentane-1,3-dione nucleus (I) on one hand and a compound having a 2-(1′-hydroxy - 1′ - tetralino)-ethylene (IIa) or S-(2-(1′-tetraliden)ethyl thiuronium (IIb) nucleus on the other hand, to give the compound having a 8,14-secogona-1,3,5(10),9 (11), 15-pentaene-14,17-dione nucleus (III).

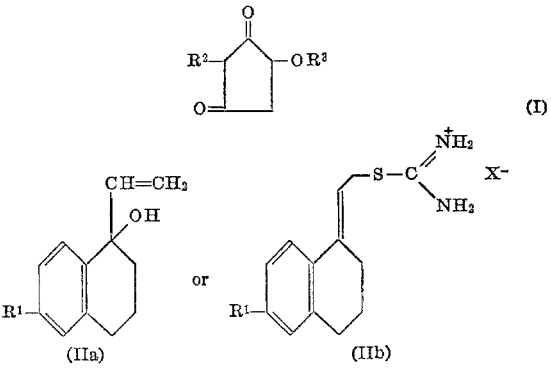

wherein X is lower acyloxy radical (e.g. acetyloxy, propionyloxy), halogen (e.g. chlorine, bromine), $ClO_4$, $(SO_4)$ ½, and each of $R^1$ and $R^2$ has the same meaning as above, and $R^3$ is hydrogen or an acyl (e.g. acetyl, propionyl or ethoxycarbonyl).

The condensation reaction of the compounds (I) and (II) is carried out with or without the use of a suitable solvent. The reaction is accelerated by the presence of a basic catalyst. As advantageous basic catalyst, there may be exemplified alkali metal hydroxide (e.g. sodium hydroxide and potassium hydroxide), alkali metal carbonate (e.g. sodium carbonate, sodium hydrogen-carbonate, potassium carbonate and potassium hydrogen-carbonate), alkali metal acylate (e.g. sodium acetate and potassium acetate), quaternary ammonium hydroxide (e.g. trimethyl benzyl ammonium hydroxide), tertiary amine (e.g. trimethylamine, triethylamine), anion exchange resin (e.g. strongly basic styrene-type copolymer resin), metal alkoxide (e.g. sodium methoxide, sodium ethoxide, potassium methoxide, potassium ethoxide and magnesium ethoxide), alumina and a mixture of two or more thereof. Basic solvent, such as acid amide (e.g. dimethylformamide and dimethylacetamide), and amine (e.g. pyridine, collidine and aldehydecollidine) can be used solely or in combination with any other basic catalyst, not only as the catalyst but also as the solvent for the reaction. Other desirable solvents include, for example, methanol, ethanol, n-propanol, isopropanol, n-butanol, tetrahydrofuran, dioxane, ether, petroleum ether, chloroform, benzene, toluene and xylene, and any other solvent can be used in so far as it does not inhibit or disturb the desired condensation reaction. The reaction may proceed under cooling or at room temperature and may be accelerated by heating. Usually, it is convenient to carry out the reaction at the neighborhood of 130° C. or under refluxing conditions. In order to have an equilibrium migrate towards an acceleration of the reaction, water produced in the course of condensation reaction can desirably be eliminated from the reaction mixture by heating or as its azeotropic mixture with the solvent used. For the same purpose, a basic or neutral dehydrating agent can be allowed to coexist in the reaction system, the dehydrating agent being exemplified by calcium oxide or so-called molecular sieve. Thus-obtained, compounds having a 13-(hydrocarbon substituted) - 8,14 - secogona-1,3,5(10), 9(11),15-pentaene-14,17-dione nucleus are exemplified as follows:

8,14-secoestra-1,3,5(10),9(11),15-pentanene-14,17-dione;
3-methoxy-8,14-secoestra-1,3,5(10),9(11),15-pentaene-14,17-dione;
3-ethoxy-8,14-secoestra-1,3,5(10),9(11),15-pentaene-14,17-dione;
13-ethyl-8,14-secogona-1,3,5(10),9(11),15-pentaene-14,17-dione;
13-isopropyl-8,14-secogona-1,3,5(10),9(11),15-pentaene-14,17-dione;

13-benzyl-8,14-secogona-1,3,5(10,)(11),15-pentaene-14,17-dione;

13-phenyl-8,14-secogona-1,3,5(10),9(11),15-pentaene-14,17-dione;

3-methoxy-13-ethyl-8,14-secogona-1,3,5(10),9(11),15-pentaene-14,17-dione;

3-methoxy-13-n-propyl-8,14-secogona-1,3,5(10),9(11), 15-pentaene-14,17-dione;

3-methoxy-13-isopropyl-8,14-secogona-1,3,5(10),9(11), 15-pentaene-14,17-dione;

3-methoxy-13-phenyl-8,14-secogona-1,3,5(10),9(11),15-pentaene-14,17-dione;

3-methoxy-13-benzyl-8,14-secogona-1,3,5(10),9(11),15-pentaene-14,17-dione.

The second step of the present process is an acylation of the compound (IV) employing a conventional acylating agent (i.e. aliphatic or aromatic acid or its reactive derivative, e.g. acetic acid, acetyl chloride, benzoyl chloride, propionyl chloride, succinic acid anhydride, etc.), to obtain the 17-acyloxy compound represented by the formula

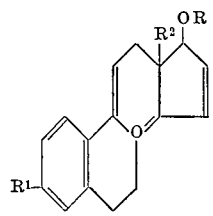

(V)

wherein R is an acyl radical and each of $R^1$ and $R^2$ has the same meaning as mentioned above.

The third step of the present total synthesis is an intramolecular cyclization of the compounds (V), resulting in closure of the ring C to give the compound having a 16-(etherified or esterified hydroxy)-17-acyloxy-13-(hydrocarbon substituted)gona-1,3,5(10),8,14-pentaene nucleus represented by the formula

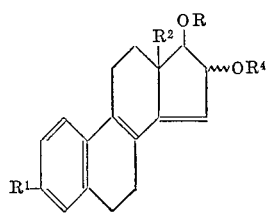

(VI)

wherein $R^4$ is the residue of an alcohol, phenol or fatty acid, and each of $R^1$, $R^2$ and R has the same meaning as the above.

The cyclization reaction is conducted by allowing the compound (V) to contact with an acid catalyst in the presence of an alcohol (e.g. methanol, ethanol, butanol, isopropanol), a phenol (e.g. phenol, cresol), a fatty acid (e.g. acetic acid, propionic acid, butyric acid) or their mixture. The acid catalyst can be an inorganic acid or anhydride thereof (e.g. hydrochloric acid, sulfuric acid, phosphoric acid, phosphorus pentoxide and polyphosphoric acid), hydrogen salts or partial esters of these polybasic inorganic acids (e.g. sodium hydrogen sulfate, monosodium dihydrogen phosphate and monomethyl sulfate), their pyridine complexes (e.g. pyridine-hydrobromic acid complex), sulfonic acids (e.g. methanesulfonic acid, ethanesulfonic acid, benzenesulfonic acid and toluenesulfonic acid), sulfonated styrene type cation exchange resins, so-called Lewis acids (e.g. aluminum chloride, boron trifluoride and tin chloride), silica gel, etc.

This reaction does not require any solvent. However, the reaction can be effected more smoothly by the use of a suitable solvent, such as benzene, toluene, xylene, tetrahydrofuran, dibutyl ether, methanol, ethanol and propanol. This reaction is also accelerated by heating and takes place easily under mild heating. The reaction is advantageously carried out in the range of about 60° C. to about 100° C.

The fourth step of the present invention comprises selective reduction of the compound having a 16-(etherified or esterified hydroxy)-17-acyloxy-13-hydrocarbon substituted)gona-1,3,5(10),8,14-pentaene nucleus, desirably after hydrolysis of the said compound in, per se, conventional manner (e.g. in the presence of an alkaline agent, for example, sodium hydroxide, potassium hydroxide, etc.), to produce a compound having a 16-(etherified or esterified hydroxy)-17-(hydroxy or acyloxy)-13-(hydrocarbon substituted)-gona-1,3,5(10),8-tetraene nucleus represented by the formula:

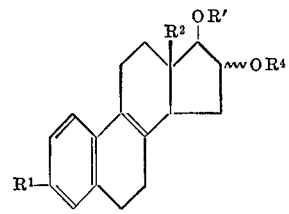

(VII)

wherein each of $R^1$, $R^2$ and $R^4$ has the same meaning as mentioned above, and $R^1$ means hydrogen or R which has the same meaning as mentioned above.

The conversion of the compound (VI) to the compound (VII) is conveniently effected by so-called catalytic reduction. For this purpose, Raney nickel or palladium catalyst is advantageously used. The reaction can be carried out in a suitable solvent which is exemplified by dioxane, tetrahydrofuran, ether, methanol, ethanol and acetic acid. The reaction usually takes place at an ambient temperature; but, if required, it may be carried out at an elevated or lowered temperature. At any event, too drastic conditions should be avoided for this reaction, since there may take place further hydrogenation at the positions 8 and 9 which may result in a configuration of the hydrogen at the position 8 which is opposite that of the natural steroids.

The conversion of the compound (VI) to the compound (VII) is also effected by employing such reducing agent as hydrazine-hydrogen-peroxide, nickel-aluminium alloy and alkaline agent, etc. as well as by means of biological reduction.

Thus-prepared compound (VII) can be subjected to a further reduction to saturate the double bond at the position 8.

The reduction is preferably carried out by allowing an alkali metal to react with compound (VII) in liquid ammonia. The alkali metal may be lithium, sodium and potassium, for example. The reaction is carried out in liquid ammonia or its mixture with an inert solvent. The inert solvents for the purpose include, for example, ether, dioxane and tetrahydrofuran. Since the agent is rather violent, the reaction is usually brought about at a lowered temperature, e.g. below ambient temperature to about —30° C. The acyloxy radical of the 17-position can be converted to hydroxyl radical in the course of this reaction.

In this way, there is produced with a good yield a compound having a 17-hydroxy-16-(etherified or esterified hydroxyl) - 13 - (hydrocarbon substituted)gona - 1,3,5(10)-triene nucleus represented by the formula:

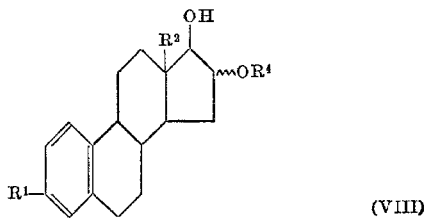

wherein each of $R^1$, $R^2$ and $R^4$ has the same meaning as mentioned above.

Thus-prepared compound (VIII), if desirable, after being acylated at the hydroxyl radical at the position 17, can be reduced to saturate the double bond at the aromatic ring to produce a compound having a 16-(etherified or esterified hydroxyl) - 13-(hydrocarbon substituted)-gona-2,5(10)-dien-17-ol nucleus (IX). The reduction can advantageously be carried out by allowing an alkali metal to react with compound (VIII) in liquid ammonia containing a proton source such as alcohol having up to 6 carbon atoms (e.g. methanol, ethanol, tertiary-butanol), other conditions being the same as the above. In the same manner as this reaction, the compound having a 17-acyloxy-16-(etherified or esterified hydroxyl)-13-substituted-1,3,5(10), 8-tetraene nucleus (VII) can also be converted to the same product (IX), and the double bond at the position 8 as well as the double bond on the aromatic ring saturated:

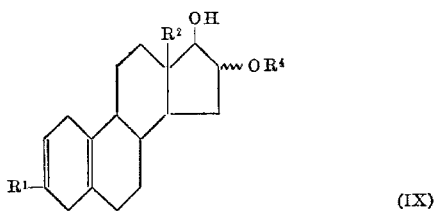

wherein each of $R^1$, $R^2$ and $R^4$ has the same meaning as mentioned above.

Thus-obtained compounds (VII), (VIII) and (IX), if desired, after being acylated at the 17-hydroxyl radical, are converted respectively to those compounds having a 13 - (hydrocarbon substituted)gona polyen-17-one nucleus: i.e. a compound having a 13-(hydrocarbon substituted)gona-1,3,5(10),8-tetraen-17-one nucleus (X), a compound having a 13-(hydrocarbon substituted)gona-1, 3,5(10) - trien - 17 - one nucleus (XI) and a compound having a 13 - (hydrocarbon substituted)gona - 2,5(10)-dien-17-one nucleus (XII), by treating the compounds (VII), (VIII or (IX) with an acid reagent. The acid reagent may be any of pyridine hydrochloride, quinoline hydrochloride, potassium hydrogensulfate, hydrogen iodide, hydrogen bromide and organic sulfonic acids, as well as aluminum chloride, boron trifluoride and phosphoric anhydride and other Lewis acids. In contrast to the acid catalyst for use in the ring-closing reaction mentioned above, which need only be dehydrating, the acid reagent mentioned just above must be de-alcoholating. This reaction takes place when the steroid is contacted with the acid reagent having de-alcoholating action either in the presence or in the absence of a solvent. While the reaction proceeds at room temperature, it may be accelerated by heating to 100° to 300° C. It is preferable that the reaction be conducted in an inert gas such as nitrogen.

The above-mentioned reactions invariably proceed irrespective of whether optically active compounds or racemic compounds are involved.

It is to be understood that the following examples are solely for the purpose of illustration and are not intended to be construed as limitations of this invention, and that variations may be resorted to without departing from the spirit and scope of this invention. In the examples, "g." and "ml." are "gram(s) and "milliliter(s)," respectively. Temperatures are all uncorrected, and percentages are all on the weight basis. "Room temperature" in this specification signifies about 15° to about 30° C.

EXAMPLE 1

(1) 3-methoxy-8,14-secoestra-1,3,5(10),9(11),15-pentaene-14,17-dione

In 100 ml. of water is dissolved 2 g. of S-(2-(6-methoxy-1-tetraliden)ethyl)thiuronium acetate, followed by the addition of 1 g. of 4-hydroxy-2-methylcyclopentane-1,3-dione. The mixture is stirred at room temperature for 3 hours, at the end of which period the reaction mixture is extracted with ether. The ether extract is washed with water and dried, followed by evaporation of ether to give 1 g. of 3-methoxy-8,14-secoestra-1,3,5(10),9(11),15-pentaene-14,17-dione in the form of yellow crystals.

(2) (±)3-methoxy-17-hydroxy-8,14-secoestra-1,3,5(10),9(11),15-pentaen-14-one 6 g. of aluminum isopropoxide is added to a solution of 1 g. 3-methoxy-8,14-secoestra-1,3,5(10),9(11),15-pentaene-14,17-dione in 100 ml. of isopropanol, and the mixture is heated at about 80° C. with agitation for one hour while evaporating acetone(by-product) and isopropanol (solvent) little by little. To the reaction mixture is added an aqueous solution of Rochelle salt (sodium potassium tartrate) and the mixture is extracted with ether. The ether layer is washed with water and dried, followed by evaporation of the ether to give 1 g. of crude oil of (±)3-methoxy-17-hydroxy-8,14-secoestra - 1,3,5(10),9(11),15-pentaen-14-one.

(3) (±)3-methoxy-17β-hydroxy-8,14-secoestra-1,3,5-(10),9(11),15-pentaen-14-one 17-benzoate In 20 ml. of pyridine is dissolved 1 g. of the crude oil obtained in step (2), and 1.5 g. of benzoyl chloride is gradually added to the resultant solution under ice-cooling, followed by stirring for 2 hours at room temperature. The reaction mixture is poured into water, followed by ether extraction. After the ether layer is twice washed with 5% aqueous solution of sulfonic acid, aqueous solution of sodium hydrogen carbonate and water respectively, it is subjected to evaporation of ether to obtain 1.5 g. of crude oil, which is subjected to column chromatography packed with silica-gel employing benzene as the eluting solution. From the first eluate, (±3-methoxy-17β-hydroxy-8,14-secoestra - 1,3,5(10),9(11),15-pentaen-14-one 17-benzoate is crystallized and it is recrystallized from methanol to give 0.4 g. of crystals melting at 110°–112° C.

*Elementary analysis.*—Calculated for $C_{26}H_{26}O_4$ (percent): C, 77.59; H, 6.51. Found (percent): C, 77.57; H, 6.53.

Ultraviolet absorption:

$$\lambda_{max.}^{ethanol} \, m\mu \, (\epsilon): 265 \, (19,700)$$

Infrared absorption:

$$\nu_{max.}^{Nujol} \, cm.^{-1}; 1713$$

Nuclear magnetic resonance spectrum ($CCl_4$):
δ values (p.p.m.):
 1.09 (singlet—3H, $C_{13}$—$CH_3$)
 3.64 (singlet—3H, $OCH_3$)
 5.55 (triplet—J=7 c.p.s., 1H, $C_{11}$—H)
 5.87 (multiplet—1H, 17 α–H)
 6.24 (quartet—J=6 c.p.s. and 17 c.p.s., 1H, $C_{15}$—H)
 6.3–6.6 (multiplet—2H, $C_2$, $C_4$—H)
 7.22 (doublet—J=8 c.p.s., 1H, $C_1$—H)
 7.3–8.02 (multiplet—$C_{16}$—H, H of ester aromatic ring)

(4) (±)3,16-dimethoxyestra-1,3,5(10),8,14-pentaen-17β-ol 17β-benzoate 0.5 g. of 17β-benzoyloxy-3-methoxy-8,14-secoestra-1,3,5(10),9(11),15-pentaen-14-one is dissolved in 50 ml. of methanol, followed by the addition of 1 ml. of concentrated hydrochloric acid. The resulting mixture is boiled for 5 minutes, at the end of which period it is poured into water, followed by extracting with ether. The extract is washed with sodium hydrogencarbonate solution and water in that order, and is dried, followed by evaporation of the other. The residue is purified by chromatography with 20 g. of silica gel to yield (±)3,16-dimethoxyestra-1,3,5(10),8,14-pentaen-17β-ol 17β-benzoate as crystals melting at 142° to 144° C. Yield, 60%.

*Elementary analysis.*—Calculated for $C_{27}H_{28}O_4$ (percent): C, 77.86; H, 6.78. Found (percent): C, 77.75; H, 6.44.

Ultraviolet absorption:

$$\lambda_{max.}^{ethanol}\ m\mu\ (\epsilon);\ 313\ (27,400)$$

Infrared absorption:

$$\nu_{max.}^{Nujol}\ cm.^{-1};\ 1723$$

Nuclear magnetic resonance spectrum ($CCl_4$):
δ values (p.p.m.):
- 1.02 (3H, $C_{13}$—$CH_3$)
- 3.30 (3H, $C_{16}$—$OCH_3$)
- 3.70 (3H, $C_3$—$OCH_3$)
- 4.66 (1H, multiplet, $C_{16}$—H)
- 5.17 (1H, doublet, $C_{17}$—H)
- 5.47 (1H, $C_{15}$—H)
- 6.4–7.2 (3H, H of ring A)
- 7.2–8.1 (5H, H of ester aromatic ring)

(5) (±)3,16-dimethoxyestra-1,3,5(10),8-tetraen-17β-ol 17-benzoate

To a solution of 0.2 g. (±)3,16-dimethoxyestra-1,3,5(10),8,14-pentaen-17β-ol 17-benzoate in 50 ml. of dioxane is added 0.3 g. of Raney nickel, followed by shaking in hydrogen gas stream. When the absorption of the hydrogen is complete, the catalyst is filtered off, and the filtrate is concentrated under reduced pressure, whereupon about 0.2 g. of crystalline (±)3,16-dimethoxyestra-1,3,5(10),8-tetraen-17β-ol 17-benzoate is obtained. On recrystallization from methanol, it turns into colorless flakes melting at 155° to 157° C.

*Elementary analysis.*—Calculated for $C_{27}H_{30}O_4$ percent): C, 77.48; H, 7.23. Found (percent): C, 77.16; H, 6.89.

Ultraviolet absorption:

$$\lambda_{max.}^{methanol}\ m\mu\ (\epsilon):\ 278\ (13,300)$$

(6) (±)3,16-dimethoxyestra-1,3,5(10)-trien-17β-ol

A solution of 0.2 g. of the (±)3,16-dimethoxyestra-1,3,5,(10),8 - tetraen - 17β-ol 17-benzoate, as prepared above, in 40 ml. tetrahydrofuran and 80 ml. liquid ammonia is cooled to —50° C. and 0.7 g. of potassium is added. The mixture is stirred for 2 hours, at the end of which period 0.5 g. of ammonium chloride is added. Then the reaction mixture is allowed to stand at room temperature so that ammonia is removed. Water is added to the residue and the resulting mixture is then extracted with ether. The extract is washed with water and dried, followed by evaporation of the ether to give about 0.15 g. of crystalline (±)3,16-dimethoxyestra-1,3,5(10)-trien-17β-ol. On recrystallization from a mixture of ether and hexane, it turns into crystals melting at 166° to 168° C.

*Elementary analysis.*—Calculated for $C_{20}H_{28}O_3$ (percent): C, 75.91; H, 8.92. Found (percent): C, 75.63; H, 8.75.

Ultraviolet absorption:

$$\lambda_{max.}^{ethanol}\ m\mu\ (\epsilon);\ 278\ (1901),\ 287\ (1883)$$

(7) (±)estrone 7 g. of pyridine hydrochloride is added to 0.15 g. of the (±)3,16-dimethoxyestra-1,3,5(10)-trien-17β-ol and the resulting mixture is heated at 200° to 220° C. for 1 hour in the presence of nitrogen gas. Then 30 ml. of 5% hydrochloric acid is added to the reaction mixture under stirring, followed by extraction with ether. The ether solution is extracted with 1N-aqueous sodium hydroxide solution, and the extract is made acidic with concentrated hydrochloric acid, followed by extraction with ether.

The ether extract is washed with water, dried, and is subjected to evaporation of the ether to give 0.05 g. of (±)estrone as crystals melting at 240° C.

EXAMPLE 2

0.13 g. of 4-hydroxy-2-methylcyclopentane-1,3-dione is dissolved in 5 ml. of a 0.12% solution of potassium hydroxide in methanol. To the solution is added a solution of 0.1 g. of 6-methoxy-1-vinyl-1-tetralol in 5 ml. of methanol at the reflux temperature, and the reflux is continued for a further 3 hours. Then, the reaction mixture is poured into water. The mixture is extracted with ether, and the ether layer is washed with 10% aqueous potassium hydroxide solution and water in that order, followed by drying. The dried ether layer is subjected to evaporation of the ether to give oily residue, which is subjected to silica gel column chromatography to give 0.04 g. of 3-methoxy-8,14 - secoestra-1,3,5(10),9,15-pentane-14,7-dione in the form of pale yellowish crystal melting at 84° C. Thereafter, the same reaction as Example 1 (2)–(7) is carried out.

EXAMPLE 3

In 100 ml. of methanol is dissolved 5 g. of S-(2-(6'-methoxy-1'-tetraliden)ethyl)-thiuronium acetate, followed by the addition of 3 g. of 4-ethoxycarbonyloxy-2-methylcycloppentane-1,3-dione. The resulting mixture is stirred at room temperature for 3 hours, at the end of which time the reaction mixture is poured into water, followed by extracting with ether. After drying, the ether is distilled out, whereupon 3.0 g. of 3-methoxy-8,14-secoestra-1,3,5(10),9,15-pentaene-14,17-dione is obtained as yellow crystals melting at 84° C. Thereafter, the same reaction as Example 1(2)–(7) is carried out.

EXAMPLE 4

(1) (±)3,16-dimethoxyestra-1,3,5(10),8,14-pentaen-17β-ol

In the mixture of 7.5 ml. of methanol and 7.5 ml. of tetrahydrofuran is dissolved 0.3 g. of 3,16-dimethoxyestra-1,3,5(10),8,14-pentaen-17β-ol 17-benzoate, followed by addition of 4 ml. of 1 normal methanolic solution of potassium hydroxide. The mixture is stirred for 1.5 hours at room temperature and then the reaction solution is poured in to water followed by extraction with ether. After the ether layer is washed with water and dried, it is subjected to the evaporation of ether to obtain 0.2 g. of (±)3,16-dimethoxyestra-1,3,5(10),8,14-pentaen-17β-ol as crystals melting at 143–8° C.

(2) (±)3,16-dimethoxyestra-1,3,5(10),8-tetraen-17β-ol

Thus obtained (±)3,16-dimethylestra-1,3,5(10),8,14-pentaen-17β-ol is treated in the same manner as in Example 1 (5) to obtain (±)3,16-dimethoxyestra-1,3,5(10),8-tetraen-17β-ol as crystals melting at 142–4° C. Yield: 90%.

*Elementary analysis.*—Calculated for $C_{20}H_{26}O_3$ (percent): C, 76.40; H, 8.34. Found (percent): C, 76.16; H, 8.28.

The accompanying chart visualizes the total synthesis according to the invention.

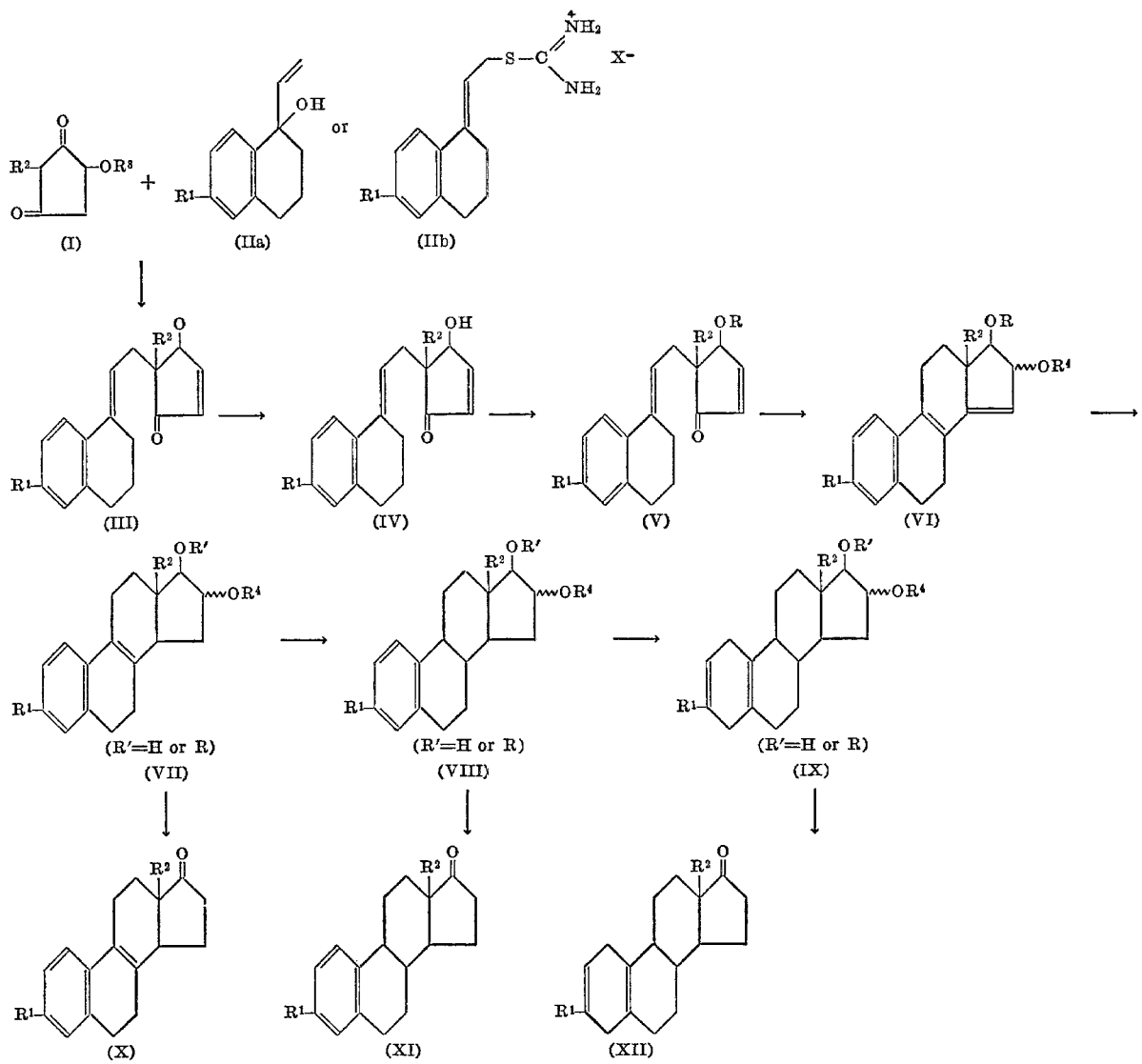

What is claimed is:

1. A process for preparing a compound having a 16-($R^4O$— group wherein $R^4$ is alkoxy of up to 4 carbon atoms, phenyl, methylphenyl or alkanoyl having 2 to 4 carbon atoms)-17-($R^5COO$— group wherein $R^5$ is an aliphatic or aromatic radical)-13-(hydrocarbon group that is phenyl, benzyl or alkyl of up to 4 carbon atoms) gona-1,3,5(10),8,14-pentaene nucleus which comprises bringing a compound having a 17-($R^5COO$— group wherein $R^5$ is an aliphatic or aromatic radical)-13-(hydrocarbon group that is phenyl, benzyl or alkyl of up to 4 carbon atoms)-8, 14-secogona-1,3,5(10),9(11),15-pentaen-14-one nucleus into contact with a dehydrating acid catalyst in the presence of an alkanol of up to 4 carbon atoms or phenol or cresol or an alkanoic acid having 2 to 4 carbon atoms.

2. The process of claim 1 wherein the acid catalyst is selected from the group consisting of hydrochloric, hydrobromic, sulfuric, phosphoric and polyphosphoric acids, and anhydrides, hydrogen salts, partial esters and pyridine complexes thereof, methane-, ethane-, benzene- and toluene-sulfonic acids, sulfonated styrene-type cation exchange resin, Lewis acids and silica gel, and wherein $R^5$ is methyl, ethyl, phenyl or β-carboxyethyl.

3. A process for preparing a compound having a 13-(hydrocarbon group that is phenyl, benzyl or alkyl up to 4 carbon atoms)gonapoly(di, tri or tetra)en-17-one nucleus, which comprises (1) the step of allowing a compound having a 2-(1'-hydroxy-1'-tetralino) ethylene or S-(2-(1'-tetraliden) ethyl) thiuronium nucleus to react with a compound having a 4-hydroxy-2-(hydrocarbon group that is phenyl, benzyl or alkyl up to 4 carbon atoms)cyclopentane-1,3-dione nucleus to produce a compound having a 13-(hydrocarbon group that is phenyl, benzyl or alkyl up to 4 carbon atoms)-8,14-secogona 1,3,5(10),9(11),15-pentaene-14,17-dione nucleus, (2) the step of subjecting so-obtained compound having a 13-(hydrocarbon group that is phenyl, benzyl or alkyl up to 4 carbon atoms)-8,14-secogna-1,3,5(10),9(11),15-pentaene-14,17-dione nucleus to selective reduction of the oxo radical at the position 17 to produce a compound having a 13-(hydrocarbon group that is phenyl, benzyl or alkyl up to 4 carbon atoms)-8,14-secogona-1,3,5(10),9-(11),5-pentaen-14-one-ol nucleus, (3) the step of allowing so-obtained compound having a 17-hydroxy-13-(hydrocarbon group that is phenyl, benzyl or alkyl up to 4 carbon atoms)-8,14-secogna-1,3,5(10),9(11), 15-pentaen-14-one nucleus to react with acylating agent to produce a compound having a 17-($R^5COO$— group wherein $R^5$ is an aliphatic or aromatic radical)-13-(hydrocarbon group that is phenyl, benzyl or alkyl up to 4 carbon atoms)-8, 14-secogona-1,3,5(10),9(11),15-pentaen-14-one nucleus, (4) the step of contacting so-obtained compound having a 17-($R^5COO$— group wherein $R^5$ is an aliphatic or aromatic radical)-13-(hydrocarbon group that is phenyl, benzyl or alkyl up to 4 carbon atoms)-8,14-secogona-1,3,5(10),9(11),15-pentaen-14-one nucleus with a dehydrating acid catalyst in the presence of a member selected from the group consisting of an alkanol of up to 4 carbon atoms, phenol, cresol or an alkanoic acid having 2 to 4 carbon atoms to produce a compound having a 16-($R^4O$— group wherein $R_4$ is alkoxy of up to 4 carbon atoms, phenyl, methylphenyl or alkanoyl having 2 to 4 carbon atoms)-17-($R^5COO$— group wherein $R^5$ is an aliphatic or aromatic radical)-13-(hydrocarbon group that is phenyl, benzyl or alkyl up to 4 carbon atoms)gona-1,3,5(10),8,14-pentaene nucleus, (5) the step of subjecting so-obtained compound having a 16-($R^4O$— group wherein $R^4$ is alkoxy of up to 4 carbon atoms, phenyl, methylphenyl or alkanoyl having 2 to 4 carbon atoms)-17-($R^5COO$— group wherein $R^5$ is an aliphatic or aromatic radical)-13-(hydrocarbon group that is phenyl, benzyl or alkyl up to 4 carbon atoms)gona-1,3,5(10),8,14,-pentaene nucleus, directly or after hydrolysis, to selective reduction of the double bond at the position 14 to produce a compound having a 16-($R^4O$— group wherein $R^4$ is alkoxy of up to 4 carbon atoms, phenyl, methylphenyl or alkanoyl having 2 to 4 carbon atoms)-17-(hydroxy or $R^5COO$— group wherein $R^5$ is an aliphatic or aromatic radical)-13-(hydrocarbon group that is phenyl, benzyl or alkyl up to 4 carbon atoms)-gona-1,3,5(10),8-tetraen-17-ol nucleus, and the step of contacting so-obtained compound having a 16-($R^4O$— group wherein $R^4$ is alkoxy of up to 4 carbon atoms, phenyl, methylpenyl or alkanoyl having 2 to 4 carbon atoms)-13-(hydrocarbon group that is phenyl, benzyl or alkyl up to 4 carbon atoms)gona-1,3,5(10),8-tetraen-17-ol nucleus, directly or after acylation of 17-hydroxyl radical, or after selective reduction of the double bond at the position 8, or the double bonds at the position 8 and one of the aromatic ring, with a dealcoholating acid reagent.

4. The process of claim 3 wherein the acid catalyst is selected from the group consisting of hydrochloric, hydrobromic, sulfuric, phosphoric and polyphosphoric acids, and anhydrides, hydrogen salts, partial esters and pyridine complexes thereof, methane-, ethane-, benzene- and toluene-sulfonic acids, sulfonated styrene-type cation exchange resin, Lewis acids and silica gel wherein $R^5$ is methyl, ethyl, phenyl or β-carboxyethyl and the dealcoholating acid reagent is selected from the group consisting of pyridine hydrochloride, quinoline hydrochloride, potassium hydrogen sulfate, hydrogen iodide, organic sulfonic acids, phosphoric anhydride, aluminum trichloride and boron trifluoride.

5. 3,16-dimethoxyestra-1,3,5(10),8,14 - pentaen - 17β-ol 17β-benzoate.

6. 3,16-dimethoxyestra-1,3,5(10),8-tetraen-17β-ol 17β-benzoate.

7. 3,16-dimethoxyestra-1,3,5(10)-trien-17β-ol.

8. 3,16-dimethoxyestra-1,3,5(10),8,14-pentaen-17β-ol.

9. 3,16-dimethoxyestra-1,3,5(10),8-tetraen-17β-ol.

References Cited
UNITED STATES PATENTS

| | | | |
|---|---|---|---|
| 2,779,773 | 1/1957 | Huffman | 260—397.5 |
| 3,336,347 | 8/1967 | Engelfried et al. | 260—397.5 |

HENRY A. FRENCH, Primary Examiner

U.S. Cl. X.R.

260—397.4, 476, 590; 195—5